April 19, 1932.   M. LOUGHEAD   1,855,027
METHOD OF CONSTRUCTING VEHICLE WHEEL BRAKE SHOES TO ELIMINATE SQUEAKING
Filed July 9, 1927
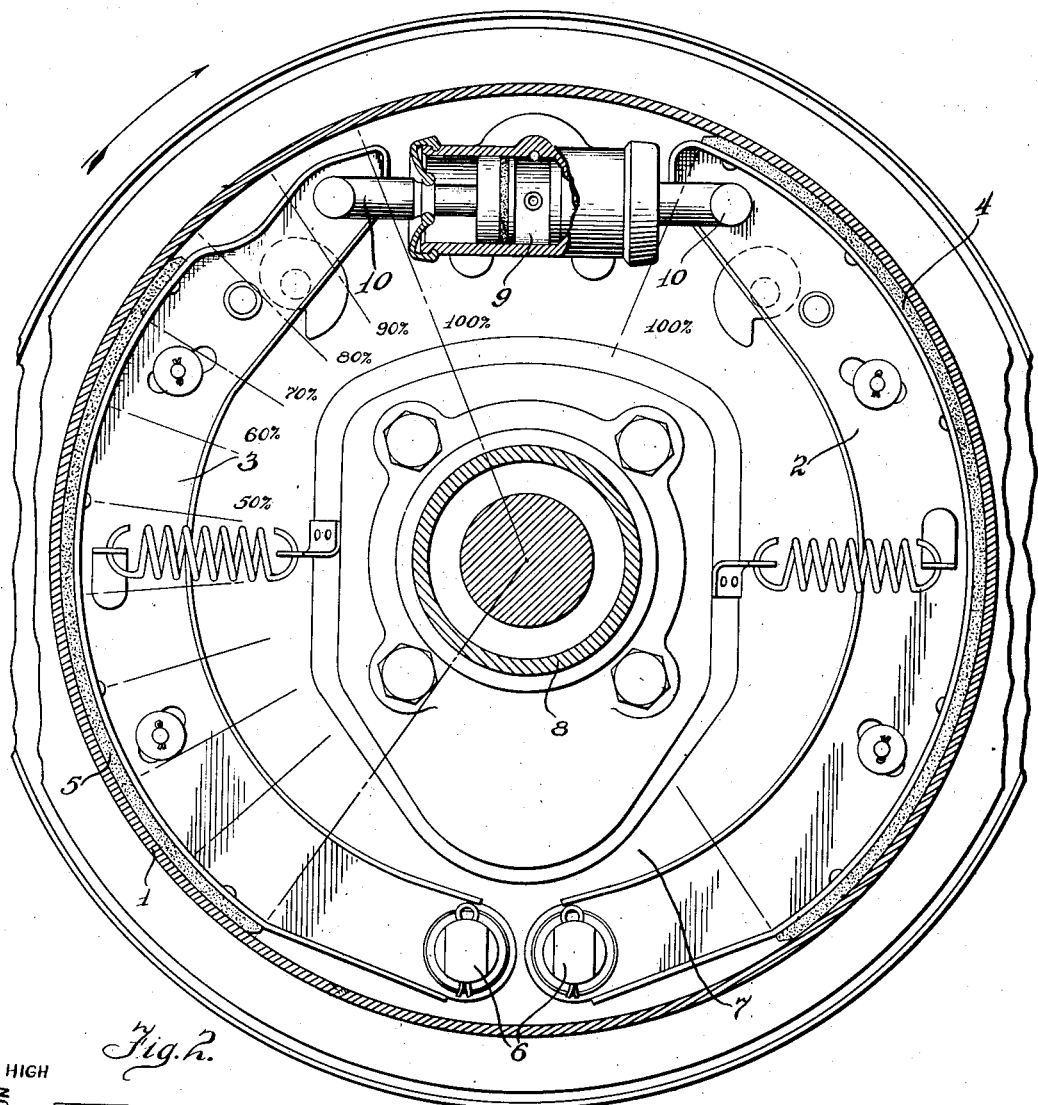
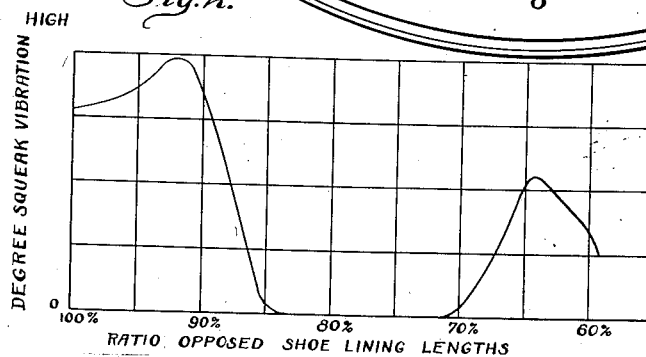
Inventor.
Malcolm Loughead.
By Williams Bradbury
McCaleb & Hinkle
Attorneys Patented Apr. 19, 1932

1,855,027

UNITED STATES PATENT OFFICE

MALCOLM LOUGHEAD, OF DETROIT, MICHIGAN, ASSIGNOR TO HYDRAULIC BRAKE COMPANY, OF LOS ANGELES, CALIFORNIA, A CORPORATION OF CALIFORNIA

METHOD OF CONSTRUCTING VEHICLE WHEEL BRAKE SHOES TO ELIMINATE SQUEAKING

Application filed July 9, 1927. Serial No. 204,456.

My invention relates to an improvement in methods for the construction of vehicle wheel brake shoes, to eliminate squeaking, and has to do more particularly with the brake mechanism employing rigid type shoes.

An object of the invention is to provide a method for the construction of vehicle wheel brake shoes employing standard and well-known types of brake linings, by means of which the occurrence of squeaks is eliminated, as when the brakes are applied.

It is well known that the present day type of rigid shoe brake—especially those employing high coefficient linings—are objectionable because of the very loud squeak which develops during the application of the brakes. Endless efforts on the part of inventors and manufacturers have, to the present time, failed to produce a rigid brake construction in which this annoying characteristic is not present.

A further object of the invention is to provide a method, as set forth, by use of which it is possible to determine, after applying the method to one set of brake shoes, the precise arrangement and dimensions for the subsequent construction of other similar brake shoes wherein the same type of brake lining and the same type of shoes are employed.

A further object of the invention is to provide a method, as set forth, which when carried out produces a brake mechanism in which ample allowance for variation in mechanical characteristics is provided for before squeaking is likely to occur.

Other objects and advantages of my invention will appear more fully from the following description and from the accompanying drawings, in which similar characters of reference indicate similar parts throughout the several views.

Fig. 1 is an elevation, partially in section, illustrating a brake mechanism employing a shoe constructed in accordance with the invention, and Fig. 2 is a graph, such as employed in carrying out the method.

My improved method for the construction of brake shoes is applicable to all types of rigid shoe brakes in which more than one of such shoes is employed in connection with a brake drum.

In Fig. 1, I have illustrated such a brake mechanism, which consists chiefly in a brake drum 1, a rigid, forward shoe 2 and a rigid trailing shoe 3.

The shoes 2 and 3 each carry brake linings 4 and 5, respectively, and are pivotally mounted at 6 to a stationary dust pan or housing 7 carried by the axle assembly 8.

The shoes 2 and 3 are moved into operative engagement with the drum 1 by the admission of fluid under pressure to a fluid motor 9 having opposed pistons connected at 10 to the adjacent free ends of the shoes. The mechanism employed for applying fluid pressure to the motor is fully set forth in my prior Patent No. 1,249,143, December 4, 1917.

The shoe 3, as shown, is a shoe constructed in accordance with the herein described method. In the present type of construction, the shoes 2 and 3 possess identical, complementary contour.

Assuming, for the present, that the shoe 3 is an identical complement of the shoe 2 and that, as is characteristic with such construction, a loud, objectionable squeak is present when the shoes are applied, the first step in determining the construction of the trailing shoe 3 to eliminate this squeak is to first cut away a short portion of the lining 5 from the free or trailing end of the shoe. The brakes are then applied and the degree of amplitude of the squeak vibration is observed. This step should be repeated, cutting away very small portions of the trailing end of the lining, until the squeak is entirely eliminated.

In Fig. 2, I have shown a graph which is similar to that which may be employed to assist the operator in determining the proper ratio between the trailing shoe and opposed shoe lining lengths for the elimination of squeaks. In this case, the squeak disappeared completely when 84 percent of the brake lining of the trailing shoe remained.

The next step consists in the cutting away of slight portions at a time of more of the brake lining until the squeak appears again.

From the graph in Fig. 2, it will be noticed that this squeak appeared again at audible amplitude when but 64 percent of the lining remained, and that the noise or squeak started to occur when but 70 percent of the lining remained.

Referring now to the graph, we have certain definite relationships established between the length of the lining of the trailing shoe 3 and the lining of the opposed shoe as against amplitude of the squeak vibrations. The shoe 3 is therefore constructed and provided with a brake lining 5 whose length is 78 percent that of the length of the lining on the shoe 2.

Ample allowance has been provided for slight variations in mechanical characteristics before the squeak again occurs such as might be expected from the natural heat expansion of the shoe or other slight mechanical changes, due to wear.

Having thus described my invention, what I claim as new and desire to secure by Letters Patent of the United States is:

1. A method of constructing vehicle wheel shoes to eliminate squeaking, which consists in cutting away a portion of the brake lining on the trailing brakeshoe so that the lining on the trailing shoe bears a predetermined relation to the length of the lining on the opposed shoe to prevent squeaking.

2. A method of constructing vehicle wheel shoes to eliminate squeaking, which consists in cutting away a portion of the brake lining on the trailing end of the trailing brakeshoe so that the length of the lining of the trailing shoe is less than that of the opposed shoe by an amount sufficient to prevent squeaking.

3. A method of constructing vehicle wheel shoes to eliminate squeaking, which consists in successively cutting away slight portions of the brake lining of the trailing shoe until the squeak when the brakes are applied disappears and in cutting away a further portion of the brake lining so as to provide allowance for variations in mechanical characteristics which might permit the squeak to reappear.

4. A method of constructing vehicle wheel shoes to eliminate squeaking, which consists in successively cutting away slight portions of the brake lining at the trailing end of the trailing shoe until the squeak when the brakes are applied disappears and in cutting away a further portion of the brake lining so as to provide allowance for variations in mechanical characteristics which might permit the squeak to reappear.

5. A method of constructing vehicle wheel shoes to eliminate squeaking, which consists in cutting away a portion of the brake lining on the trailing shoe, the amount of lining to be cut away determined by cutting away successive portions of the lining of the shoe until the squeak occurring when the brakes are applied disappears, in cutting away additional successive portions of the lining until the squeak reappears, and in providing a brake lining of the length determinable by the length of the lining which extended at the mid point between where the squeak disappeared and where it reappeared.

6. A method of constructing vehicle wheel shoes to eliminate squeaking, which consists in cutting away a portion of the brake lining on the trailing shoe, the amount of lining to be cut away determined by cutting away successive portions of the lining at the trailing end of the shoe until the squeak occurring when the brakes are applied disappears, in cutting away additional successive portions of the lining until a point is reached where the squeak reappears, and in providing a brake lining which extends from the trailing end of the trailing shoe to a point intermediate the point where the squeak disappeared and point where it reappeared.

7. In a brake mechanism, a forward brake shoe, a trailing brake shoe, a brake lining on the forward brake shoe and a brake lining on the trailing brake shoe, the lining on the toe of the trailing shoe having a length bearing a predetermined relation to the squeaking characteristics of the brake mechanism such that squeaking is eliminated.

8. In a brake mechanism, a forward brake shoe provided with a lining, and a trailing brake shoe provided with a lining, the lining on the toe of the trailing brake shoe having a length shorter than the lining of the forward brake shoe as determined by the squeaking characteristics of the brake mechanism.

In witness whereof, I hereunto subscribe my name this 6th day of July, 1927

MALCOLM LOUGHEAD.